(12) United States Patent
Berg et al.

(10) Patent No.: US 6,545,969 B1
(45) Date of Patent: Apr. 8, 2003

(54) MONOLITHIC OPTICAL HEAD

(75) Inventors: John Berg, Bellingham, MA (US);
David Buswell, Townsend, MA (US);
John Ritter, Wayland, MA (US)

(73) Assignee: Terastor Corporation, San Jose, CA (US)

( * ) Notice: Subject to any disclaimer, the term of this patent is extended or adjusted under 35 U.S.C. 154(b) by 0 days.

(21) Appl. No.: 09/453,667

(22) Filed: Dec. 3, 1999

Related U.S. Application Data

(60) Provisional application No. 60/110,993, filed on Dec. 4, 1998.

(51) Int. Cl.⁷ .................................................. G11B 7/00
(52) U.S. Cl. ............................. 369/112.23; 369/112.25
(58) Field of Search ..................... 369/44.14, 44.21, 369/44.22, 44.23, 112.23, 112.24, 112.25, 112.26; 359/719

(56) References Cited

U.S. PATENT DOCUMENTS

| | | | |
|---|---|---|---|
| 5,150,338 A | 9/1992 | Birecki et al. | |
| 5,615,203 A | 3/1997 | Fukakusa | |
| 5,881,042 A | 3/1999 | Knight | |
| 6,243,350 B1 * | 6/2001 | Knight et al. | 369/44.23 |
| 6,324,149 B1 * | 11/2001 | Mifune et al. | 369/112.23 |

FOREIGN PATENT DOCUMENTS

| | | |
|---|---|---|
| EP | 0951015 | 10/1999 |
| WO | WO 97/39445 | 10/1997 |
| WO | WO97/41556 | 11/1997 |
| WO | WO99/16063 | 4/1999 |

* cited by examiner

*Primary Examiner*—Thang V. Tran
(74) *Attorney, Agent, or Firm*—Fish & Richardson P.C.

(57) ABSTRACT

A monolithic optical head facilitates reading and writing optical data on an optical recording medium. The optical head includes a monolithic substrate formed of an optically transparent material. The substrate has a first side and a second flat side opposing the first side. The first side includes a central region that has a curved surface to produce a lensing effect, and a peripheral region. The second flat side has a central portion opposing the curved surface to couple radiation from and to the curved surface through the substrate. The second flat side also has a peripheral portion opposing the peripheral region of the first side.

23 Claims, 5 Drawing Sheets

MONOLITHIC OPTICAL HEAD

CROSS-REFERENCE TO RELATED APPLICATIONS

This application claims the benefit of the U.S. Provisional Application No. 60/110,993, filed on Dec. 4, 1998.

BACKGROUND OF THE INVENTION

The present invention generally relates to substrate processing and optical heads for optical storage.

In an optical storage system, an optical head is used to read data from or write data to an optical recording medium. Hence, an optical head is a critical component. See, U.S. patent application Ser. No. 08/641,513 filed on May 9, 1996 (to be issued), Ser. No. 08/657,145 filed on Jun. 3, 1996, and Ser. No. 08/846,916 filed on Apr. 29, 1997. Such an optical head may be used in a near-field optical configuration by at least coupling radiation energy via evanescent fields to achieve a high areal density.

An optical head may be formed by using a composite design that has different components. In general, different components may use different materials. One embodiment of this type of composite optical head 100 is shown in FIG. 1. A substrate 102 has a through hole 104 for placing a lens 110 that has a spherical surface 112 and an opposing flat surface 114 for coupling radiation energy. Bond joints 106 are used to fix the sides of the lens 110 to the sidewalls of the hole 104. An objective lens 120 is attached to the substrate 102 by, for example, bond joints 108 over the hole 104. Hence, lenses 110 and 120 are fixed relative to each other to define an optical path that is clear of joint bonds 106 or 108. The lens 120 receives a substantially collimated beam and focuses the beam to the lens 110. The lens 110 then couples optical energy of the beam to and from an optical storage medium 118 located on an optical storage medium holder, e.g.a disc platter.

The lens 110 may be a solid immersion lens formed of a higher index material. The lens 110 may be a semispherical lens where the apex of the spherical surface 112 is spaced from the flat surface 114 by one radius of the curvature. Alternatively, the spacing between surfaces 112 and 144 can be greater than the radius to form a super hemispherical lens. The flat bottom surface 114 may be coplanar with an air-bearing surface 116. The air-bearing surface 116 is preferably implemented at the base of the optical head 100 to maintain a desired focus without conventional servo optics for focusing. The flat bottom surface 114 of the lens 110 and the air-bearing surface 116 are designed to ride at a predetermined height above the optical storage medium 118 by the air bearing caused by the motion of the head 100 relative to the medium 118, while rotating at a specific speed.

The above composite optical head 100 requires discrete bonding. Different components are bonded to the substrate 102. Such construction can suffer certain drawbacks, such as limited sphere quality of the lens 110 due to roll lapping capability and stresses present in the bond joints 106 and 104. The surface shape of the lens 120 is also limited to the spherical shape only. Furthermore, alignment precision is limited by the assembly precision.

SUMMARY OF THE INVENTION

The inventors recognized the above limitations and designed a monolithic construction of the optical head. The substrate and certain optical components are formed from a monolithic piece of a substantially optically transparent material.

The optical head for an optical disk drive includes a monolithic substrate formed of an optically transparent material. The substrate has a first side and a second flat side opposing the first side. The first side includes a central region that has a curved surface to produce a lensing effect, and a peripheral region. The second flat side has a central portion opposing the curved surface to couple radiation from and to the curved surface through the substrate. The second flat side also has a peripheral portion opposing the peripheral region of the first side.

A contour of the curved surface and spacing between an apex of the curved surface and the second flat side are selected to produce optical numerical apertures at the second side greater than unity. The peripheral portion of the second flat side and the peripheral region of the first side are sufficiently large to allow the flat surface to produce an air-bearing force to suspend the substrate above a rotating disk at a predetermined speed.

A method of manufacturing a lens array having multiple monolithic optical heads is also disclosed. The method includes providing a transparent wafer substrate having multiple dice, positioning a cutting tool above a particular die on the substrate, and rotating the tool at relatively high speed. The tool is then plunged into the substrate and the force is controlled to produce a desired shape for a lens. The cutting tool is repositioned above a next die on the substrate and the above steps are repeated if necessary.

BRIEF DESCRIPTION OF THE DRAWINGS

Different aspects of the present invention will be described in reference to the accompanying drawings wherein.

DESCRIPTION OF THE PREFERRED EMBODIMENTS

The present devices and techniques are based on a monolithic design of optical heads to form different components of a head in a single substrate. Such a monolithic optical head can enhance the performance in reading and writing optical data on an optical recording medium, and improve the device accuracy and reliability of the head in comparison to composite heads.

Figure 2:
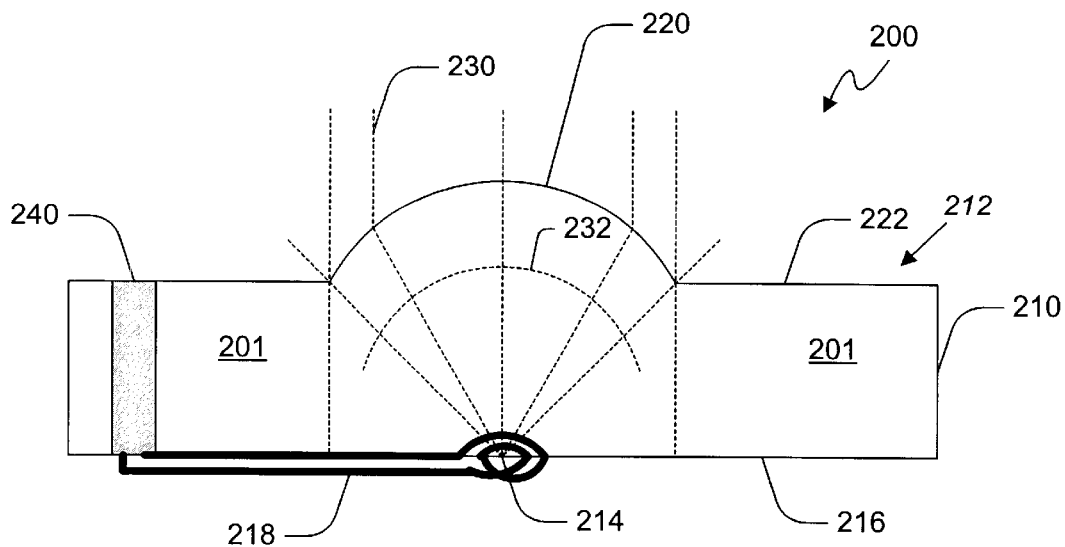
FIG. 2 shows a monolithic optical head according to one embodiment.

FIG. 2 shows one design of an optical head 200. A substrate 210 is processed to have an upper surface 212 and a lower surface 216 that opposes the upper surface 212. The upper surface 212 includes a central curved surface 220 and a peripheral surface 222. The curved surface 220 is designed to cause a lensing effect to occur so that there is no need to mount an objective lens and a solid immersion lens to the substrate 210. The substrate 210 is preferably manufactured from a substantially optically transparent material so that the optical wave front 212 impinging on the curved surface 220 is focused onto a small area 214 on the flat bottom surface 216 of the substrate 210.

Figure 1:
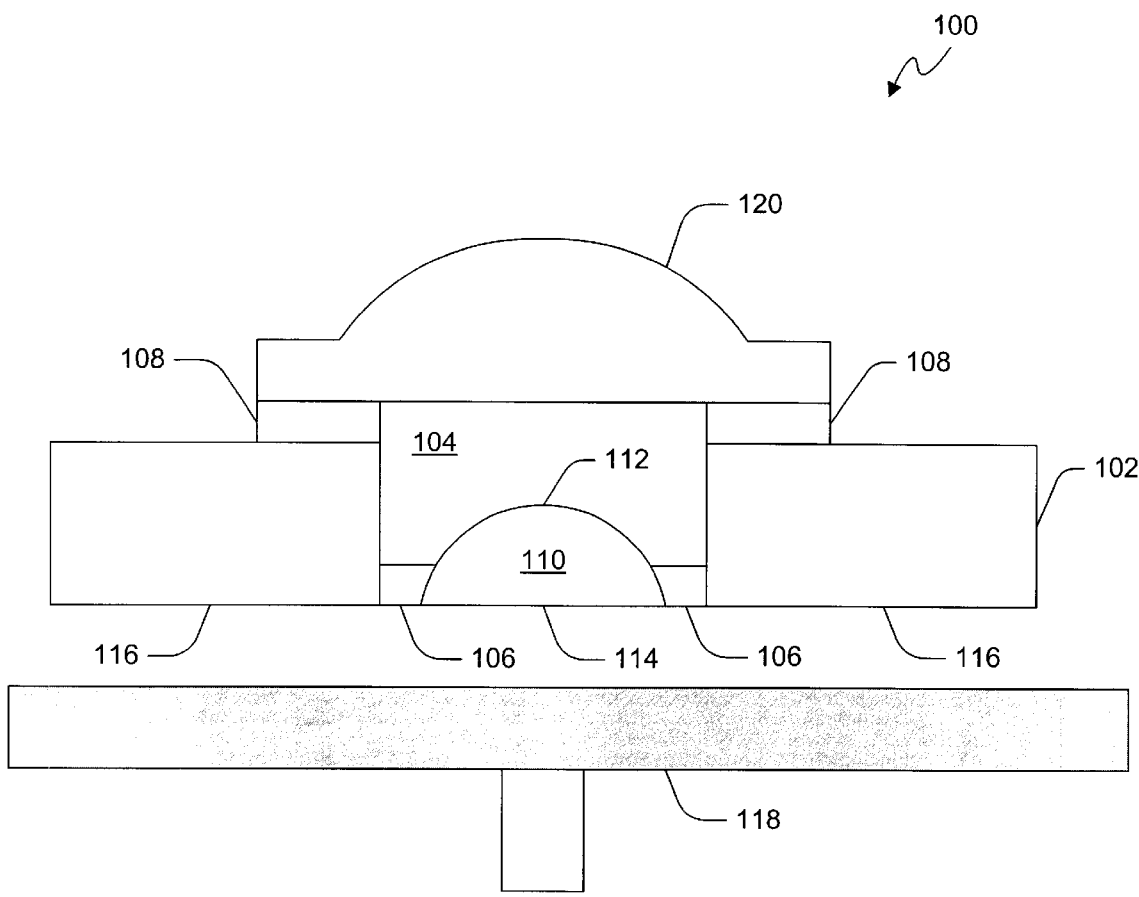
FIG. 1 shows one embodiment of an optical heads formed with several components.

The contour of the curved surface 220 and the spacing between the apex of the surface 220 and the flat surface 216 are selected to effect the combined optical functions of the objective lens 120, the optical path 104 and the SIL 110 in the composite head 100 of FIG. 1. For a given wavelength of the wave front 230, increasing the numerical aperture of the curved surface 220 can reduce the focused beam size. The incoming substantially flat wave front 230 is refracted at the curved surface 220 to produce a curved wave front 232 that converges to the area 214. This can result in an increased effective incident angle to the area 214 and hence increase the effective numerical aperture of the optical head 200 to be greater than unity. As a result, at least a portion of incident rays coupled from the curved surface 220 to the bottom flat surface 216 have incident angles greater than the critical angle for the total internal reflection. Such rays cannot propagate through the air gap between the optical head and the medium and must be coupled via evanescent fields through the air gap by placing the medium from the surface 126 by less than one wavelength. The contour of the curved surface 220 may be spherical or aspherical.

In some embodiments, such as in magneto-optic drives, the optical head 200 includes conductive vias 240 that provide electrical connections for a coil 218 near the area 214. The coil 218 is used to produce desired magnetic fields in reading and writing operations on a magneto-optic recording.

The head 200 includes an extended portion 201 surrounding the central optical portion to provide the majority portion of the air bearing surface 216. Since the air bearing force increases with larger air bearing surface, the extended portion can be sized sufficiently to suspend the head 200 above the optical disk at predetermined speeds.

Figure 3:
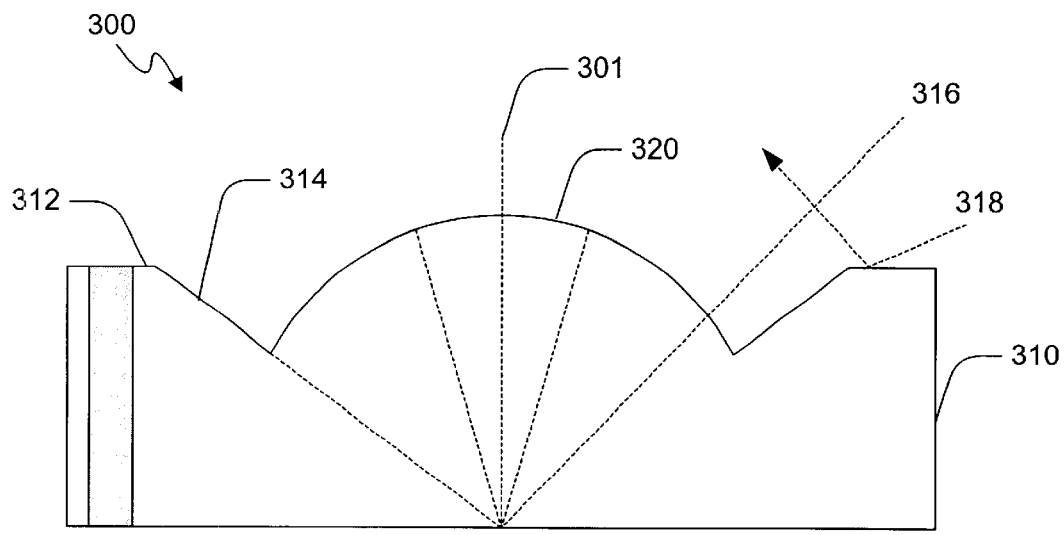
FIG. 3 shows an alternative embodiment of the monolithic optical head.

FIG. 3 shows an alternative design of the optical head 300 in which a substrate 310 is processed to have a curved surface 320. The substrate 310 can also be designed to form a flat portion 312 and a slanted surface 314 adjacent to the curved surface 320. The slanted surface 314 forms an acute angle with the optic axis 301 of the head 300. The flat portion 312 and the slope 314 are formed in such a way that the design processes only those optical rays 316 that are within a certain incident angle. The optical rays 318 with larger incident angles are not processed.

Figure 4:
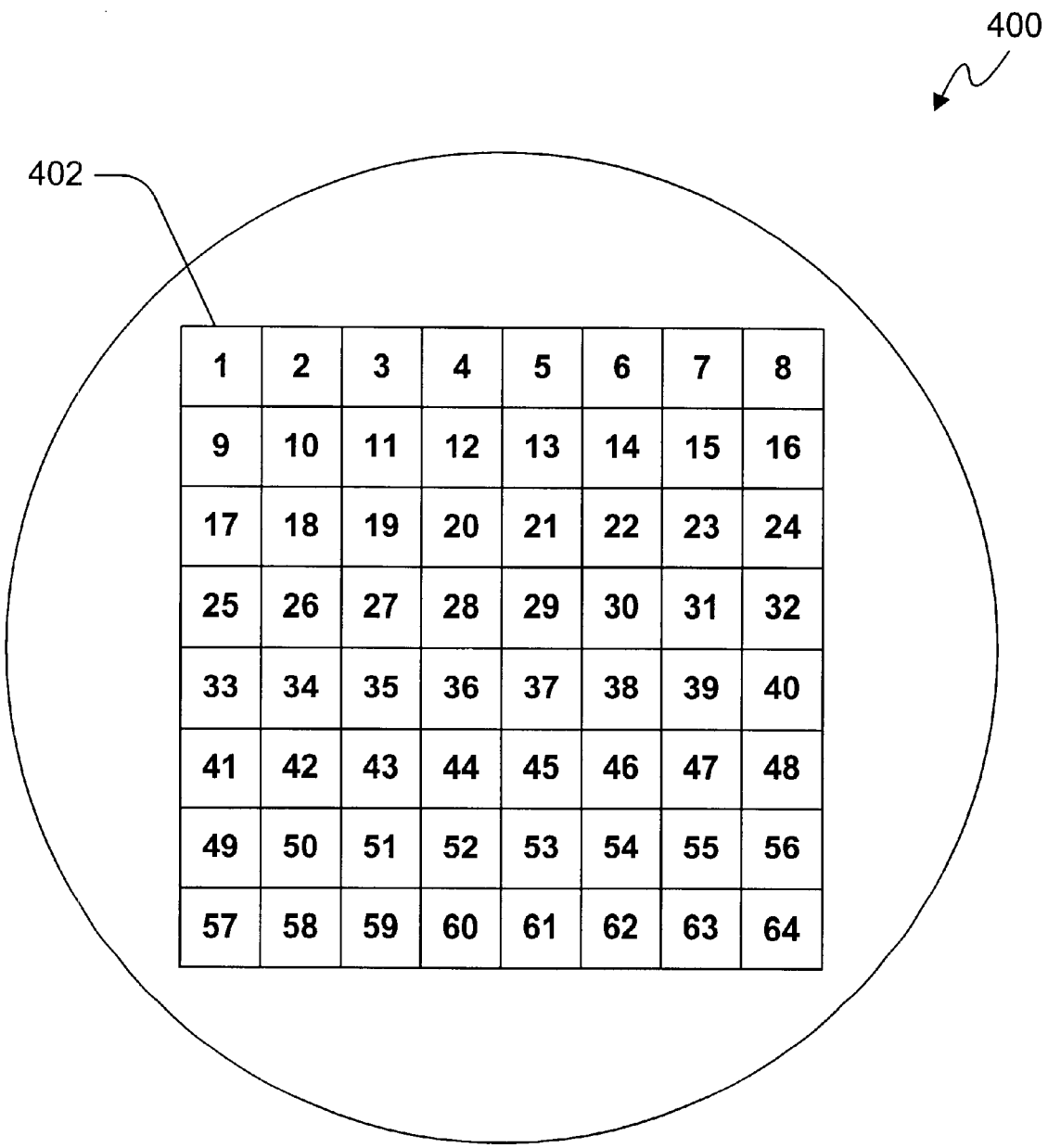
FIG. 4 illustrates one embodiment of a lens array on a wafer substrate showing an indexing order of each die.

The above monolithic optical heads can be fabricated by first forming a lens array on a substrate and then slicing the substrate into multiple heads in a batch fabrication process. FIG. 4 illustrates one embodiment of a lens array 400 on a wafer substrate showing an indexing order of each die. The lens array 400 shows the substrate divided into 64 dice. Each die 402 is micro-machined with an abrasive-plated tool to produce a monolithic optical head. The tool has an indexing means to produce a relative motion with respect to the work surface. This indexing means enables the motorized stage to reposition the tool to work on the next die according to the numerical order of the lens array 400 as shown in FIG. 4. This is done with linear encoders in the motorized stage that provide feedback of the present location.

The lens array can be formed by using an abrasive-plated tool, such as a diamond tool. This tool can be used to produce hard-to-form shapes. The tool shape incorporates a portion of the profile to be formed in revolution under machining load. The tool deflects under load and high speed such that appropriate biases must be built into the free stress tool, which under operating condition produces the desired shape. Further, the operating speed can be adjusted to avoid tool and machine resonances.

Figure 5:
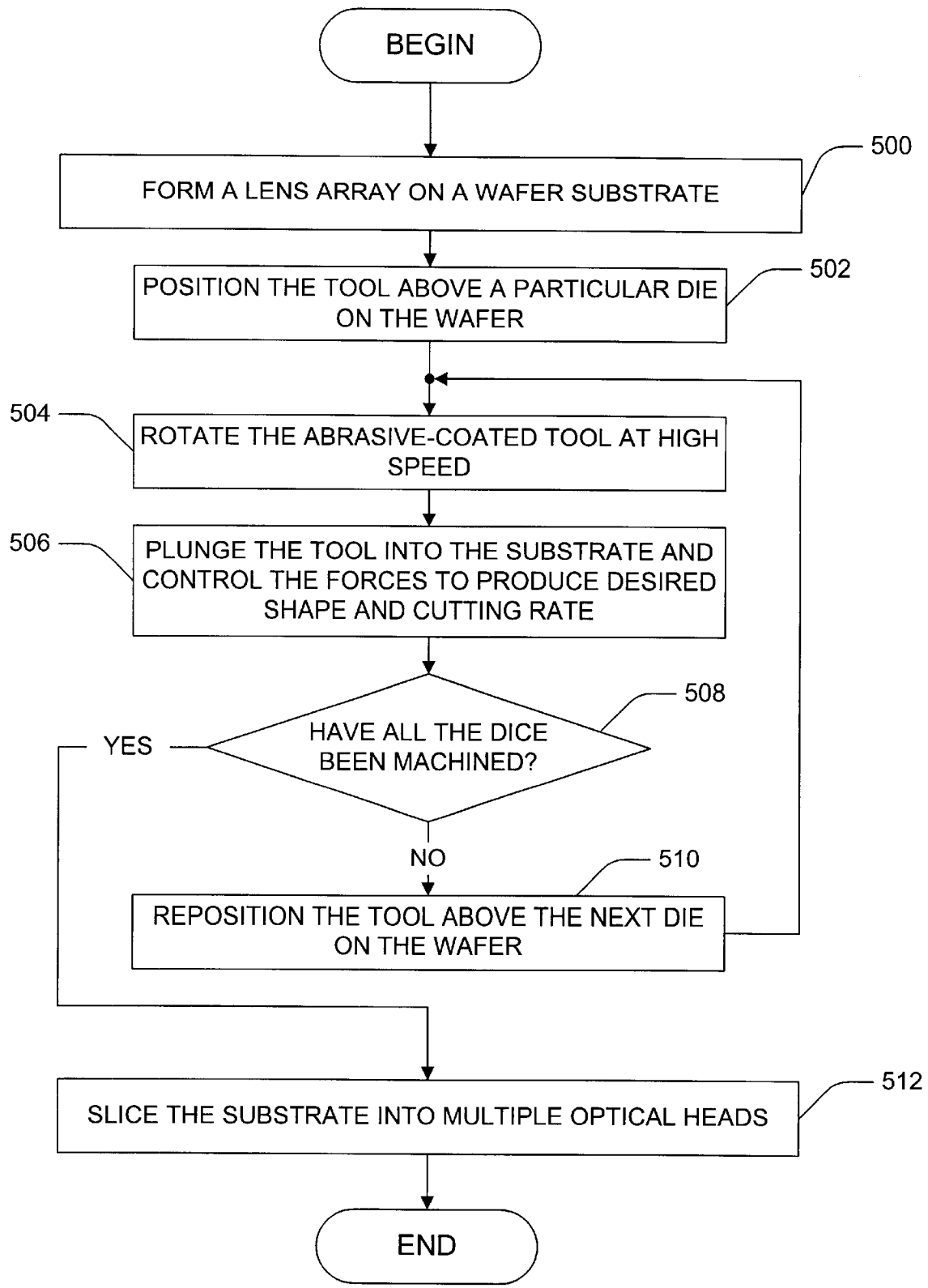
FIG. 5 is a flowchart of a lens array manufacturing process.

FIG. 5 is a flowchart of a lens array manufacturing process. One embodiment of the process begins, at step 500, by forming a lens array on a transparent wafer substrate. At step 502, an abrasive-plated tool is positioned above a particular die on the wafer. Once the tool is positioned, it is rotated at relatively high speed (step 504). The operating speed of the tool is adjusted to avoid the resonant frequencies of the tool and the machine.

The tool is plunged into the substrate at step 506. The tool force is controlled to produce desired shape and cutting rate. If there are other dice to be machined (step 508), the tool is repositioned above the next die according to the indexing means, at step 510. Otherwise, if all the dice on the wafer have been machined, the substrate is sliced into multiple optical heads, at step 512.

Based on the above processing technique, the substrate can be machined to form different shapes of optical heads and other parts. For example, spherical, aspherical or other shapes can be machined on the substrate so that a curved surface can be formed to cause the combined lensing effect of separate objective lens and near-field lens to occur.

In some embodiments, the above-mentioned monolithic optical head is designed to incorporate one or more of the lens components. For example, the head can be designed to incorporate the functions of a solid immersion lens (SIL), a combined SIL and objective lens, or a solid immersion mirror (SIM). The optical head can also be designed to incorporate conductive plated vias and integrated optical spacers. In other embodiments, built-in spacers formed with plating process are machined.

Figure 6:
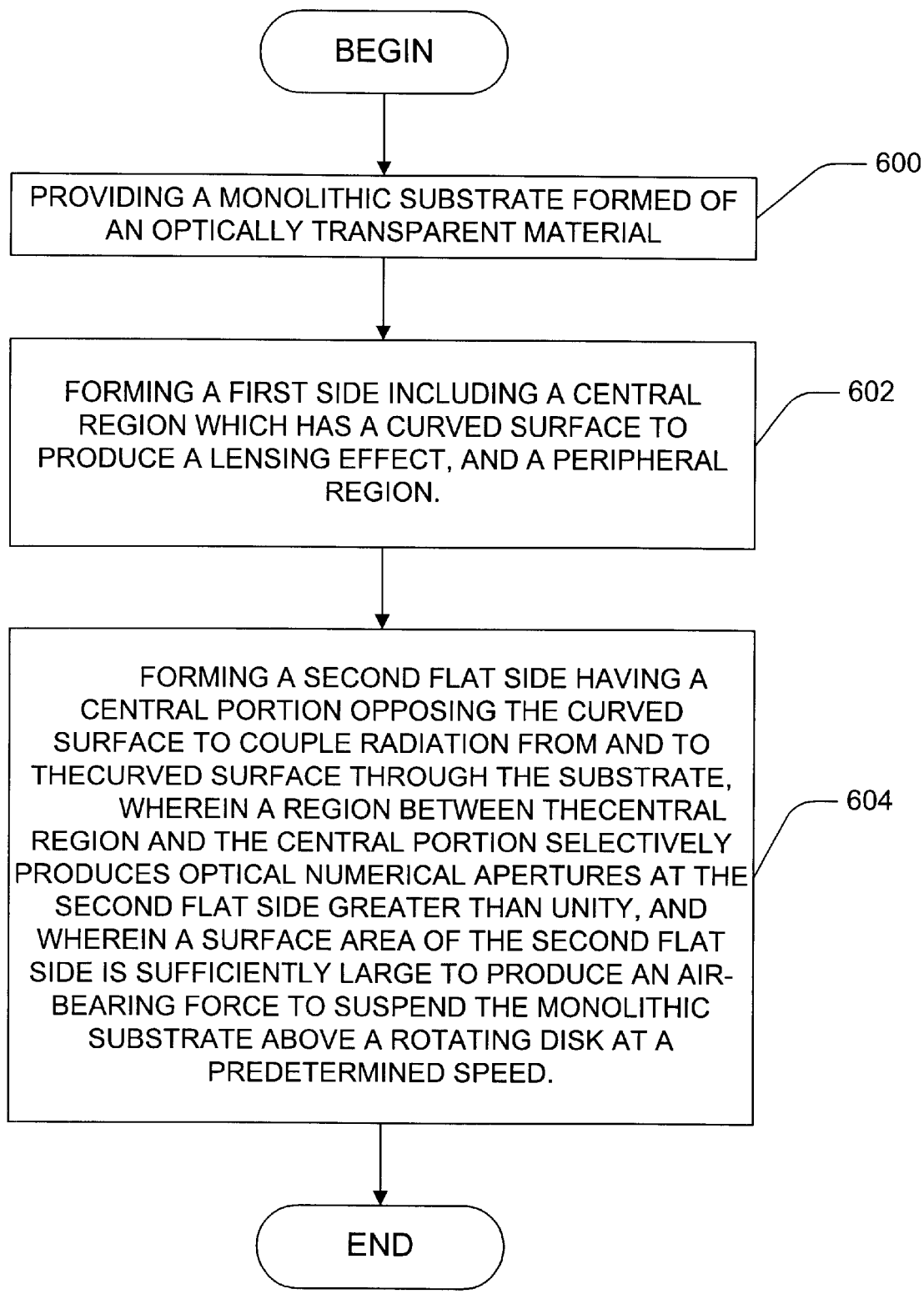
FIG. 6 is a flowchart of a monolithic optical head manufacturing process.

FIG. 6 is a flowchart of a monolithic optical head manufacturing process. The process involves providing a monolithic substrate formed of an optically transparent material at step 600. The first side is formed on the substrate at step 602. The second side opposite the first side is then formed at step 604. The first side includes a central region that has a curved surface to produce a lensing effect, and a peripheral region. The second flat side has a central portion opposing the curved surface to couple radiation from and to the curved surface through the substrate. A region between the central region and the central portion selectively produces optical numerical apertures at said second flat side greater than unity. A surface area of the second flat side is sufficiently large to produce an air-bearing force to suspend said monolithic substrate above a rotating disk at a predetermined speed.

In further embodiments, a mass transport method is used in gallium phosphide (GaP) or indium phosphide (InP) for smoothing or grinding "witness marks" to achieve ultra-smooth optical surface. The smooth surface promotes improved optical properties, particularly the transmission effectiveness.

The mass transport method includes smoothing the surface from high spatial frequency to low spatial frequency. The method effectively melts only the surface or softens the flows to the surrounding area. The surface of the material is heated to the softening point under flow of appropriate gas to facilitate transport and prevent material composition depletion. When GaP is used as the substrate material, the temperature is approximately 800° C. and the gas is phospozene or other gas containing phosphorous.

The processing efficiency can be improved by ultrasonic milling. The ultrasonic milling uses ultrasonic energy to excite abrasive particles positioned between two surfaces to effect material removal inversely proportional to the distance between those surfaces. Thus, a shape can be machined from one surface into another.

The use of a monolithic optical head is desirable and has several advantages over the use of an above-described prior art optical head with multiple components of different material. One of the advantages of a single-piece lensing element includes desirability of having exactly matched hardness and surface profile of the air-bearing surface and the flat bottom surface 216 of the optical head 200. By manufacturing the entire head with a single transparent material, the flat bottom surface of the substrate 210 effectively acts as an air-bearing surface. Further, if wear occurs on the optical head it may occur uniformly across the surface. This uniform wear allows the relationship of the physical profiles of the air-bearing surface and the flat bottom surface 216 of the lensing element 210 to remain unchanged.

Other embodiments and variations are possible. For example, even though the indexing order of the lens array on a substrate is shown to be by rows, it can be performed by columns or by any other practical patterns. In another example, stepped abrasive size tools can further improve the processing efficiency of the lens array manufacturing. Moreover, the monolithic head may be used with recording media other than magneto-optic materials such as phase change media or read-only media.

All these embodiments are intended to be encompassed by the following claims.

What is claimed is:

1. An optical head for an optical disk drive, comprising:
    a monolithic substrate formed of an optically transparent material, having a first side and a second flat side opposing said first side,
    said first side including a central region which has a curved surface to produce a lensing effect, and a peripheral region,
    said second flat side having a central portion opposing said curved surface to couple radiation from and to said curved surface through said substrate, and a peripheral portion opposing said peripheral region of said first side,
    wherein a contour of said curved surface and spacing between an apex of said curved surface and said second flat side are selected to produce optical numerical apertures at said second side greater than unity, and
    wherein said peripheral portion of said second flat side and said peripheral region of said first side are sufficiently large to allow said flat surface to produce an air-bearing force to suspend said substrate above a rotating disk at a predetermined speed.

2. The optical head of claim 1, wherein said peripheral region of said first side includes a flat area and a slanted area adjacent to said curved surface, said flat area and said slanted area operating to enhance processing of optical rays incident on said peripheral region within a certain incident angle.

3. The optical head of claim 1, further comprising:
    conductive vias formed in said transparent substrate, said conductive vias configured to provide electrical connections for a read/write coil, said read/write coil producing desired magnetic fields for a magneto-optic disk.

4. The optical head of claim 1, wherein said curved surface of said first side is spherical in shape.

5. The optical head of claim 1, wherein said curved surface of said first side is aspherical in shape.

6. A method for manufacturing an optical head for an optical disk drive, comprising:
    providing a monolithic substrate formed of an optically transparent material;
    forming a first side including a central region which has a curved surface to produce a lensing effect, and a peripheral region;
    forming a second flat side having a central portion opposing said curved surface to couple radiation from and to said curved surface through said substrate,
    wherein a region between said central region and said central portion selectively produces optical numerical apertures at said second flat side that are greater than unity, and
    wherein a surface area of said second flat side is sufficiently large to produce an air-bearing force to suspend said monolithic substrate above a rotating disk at a predetermined speed.

7. The method as in claim 6, wherein the curved surface on the first side is fabricated by a machining process based on ultrasonically milling.

8. The method as in claim 6, wherein the curved surface on the first side is smoothed by heating a softening point under flow of an appropriate gas to prevent material composition depletion.

9. The method as in claim 8, wherein the appropriate gas includes phospozene or a gas containing phosphorous.

10. The method as in claim 6, wherein the curved surface is a spherical surface.

11. The method as in claim 6, wherein the curved surface is an aspherical surface.

12. The method as in claim 6, further comprising:
    positioning a cutting tool above a particular section on the substrate;
    rotating the tool; and
    inserting the tool into the substrate and controlling the force to produce the curved surface on the first side.

13. The method as in claim 12, wherein the substrate is labeled with an index order with different site indexes to represent different locations for forming optical heads, and the method further comprising moving the tool according to the index order.

14. The method as in claim 12, wherein the cutting tool is an abrasive-plated tool.

15. The method as in claim 12, wherein the cutting tool is a diamond-cutting tool.

16. The method as claim 12, wherein the cutting tool is controlled by deflecting of the cutting tool under load and high speed operating conditions, such that appropriate biases are built into a free stress tool to produce the curved surface with a desired geometry.

17. The method as in claim 6, further comprising:
    processing different portions of the substrate to produce different curved surfaces for forming different optical heads; and
    separating the substrate into multiple pieces each having one of the curved surfaces to form multiple optical heads.

18. A method for manufacturing an optical head for an optical disk drive, comprising:
    providing a monolithic substrate formed of an optically transparent material;
    forming a first side including a central region which has a curved surface to produce a lensing effect, and a peripheral region;
    forming a second flat side having a central portion opposing said curved surface to couple radiation from and to said curved surface through said substrate,
    wherein a region between said central region and said central portion selectively produce optical numerical apertures at said second flat side greater than unity, allowing near-field recording and reading on materials such as magneto-optic and phase change media and near-field readout of read-only media, and wherein a surface area of said second flat side is sufficiently large to produce an air-bearing force to suspend said monolithic substrate above a rotating disk at a predetermined.

19. The method as in claim 18, wherein the curved surface on the first side is fabricated by a machining process based on ultrasonically milling.

20. The method as in claim 18, wherein the curved surface on the first side is smoothed by heating a softening point under flow of an appropriate gas to prevent material composition depletion.

21. The method as in claim 18, further comprising:

positioning a cutting tool above a particular section on the substrate;

rotating the tool; and inserting the tool into the substrate and controlling the force to produce the curved surface on the first side.

22. The method as claim 21, wherein the cutting tool is controlled by deflecting of the cutting tool under load and high speed operating conditions, such that appropriate biases are built into a free stress tool to produce the curved surface with a desired geometry.

23. The method as in claim 18, further comprising:

processing different portions of the substrate to produce different curved surfaces for forming different optical heads; and separating the substrate into multiple pieces each having one of the curved surfaces to form multiple optical heads.

* * * * *